(12) United States Patent
Kosse (10) Patent No.: US 11,654,432 B2
(45) Date of Patent: May 23, 2023

(54) SAMPLE CONTAINER

(71) Applicant: SpinDiag GmbH, Freiburg (DE)

(72) Inventor: Pierre Dominique Kosse, Freiburg (DE)

(73) Assignee: SpinDiag GmbH, Freiburg (DE)

( * ) Notice: Subject to any disclaimer, the term of this patent is extended or adjusted under 35 U.S.C. 154(b) by 208 days.

(21) Appl. No.: 17/234,058

(22) Filed: Apr. 19, 2021

(65) Prior Publication Data

US 2021/0237061 A1 Aug. 5, 2021

Related U.S. Application Data

(63) Continuation of application No. PCT/EP2019/076870, filed on Oct. 4, 2019.

(30) Foreign Application Priority Data

Oct. 19, 2018 (DE) .................. 102018217907.7

(51) Int. Cl.
*A61L 9/12* (2006.01)
*B01L 3/00* (2006.01)
(Continued)

(52) U.S. Cl.
CPC .......... *B01L 3/502715* (2013.01); *B32B 1/02* (2013.01); *B32B 7/027* (2019.01);
(Continued)

(58) Field of Classification Search
None
See application file for complete search history.

(56) References Cited

U.S. PATENT DOCUMENTS 5,518,790 A 5/1996 Huber et al.
7,138,032 B2 11/2006 Gandhi et al.
(Continued)

FOREIGN PATENT DOCUMENTS

CN 1086488 A 5/1994
CN 101674888 A 3/2010
(Continued)

OTHER PUBLICATIONS

ExxonMobil ExactTM Plastomer 201 Plastomer for Polymer Modification; URL: http://www.matweb.com/search/datasheet.aspx?matguid=b7b5b3d249664c00b4759dd4bd0ea1c5 [accessed on Mar. 12, 2019].

(Continued)

*Primary Examiner* — Ellen S Hock
(74) *Attorney, Agent, or Firm* — Laurence A. Greenberg; Werner H. Stemer; Ralph E. Locher (57) ABSTRACT

A sample holder includes sample carrier and sealing foil thermally sealing microfluidic sample carrier cavities. The sealing foil has a sealing layer connected with the sample carrier. Sealing layer softening temperature is near sealing temperature of the sealing layer during sealing. The sealing foil outer layer use temperature is greater than sealing heating temperature and greater than or equal to sealing temperature. The sealing foil includes a height equalizing layer having softening temperature below sealing heating temperature. The equalizing layer is ductile at temperature less than or equal to sealing heating temperature and greater than or equal to sealing temperature. A sealing foil decoupler layer, at layer temperature less than or equal to sealing heating temperature or greater than or equal to sealing temperature, is stiffer than the equalizing and sealing layers. The equalizing layer is between outer and decoupler layers and sealing layer is outwardly of decoupler layer.

12 Claims, 2 Drawing Sheets

(51) Int. Cl.
*B32B 7/027* (2019.01)
*B32B 1/02* (2006.01)
*B32B 7/12* (2006.01)
*B32B 15/08* (2006.01)
*B32B 15/20* (2006.01)
*B32B 27/08* (2006.01)

(52) U.S. Cl.
CPC ............... *B32B 7/12* (2013.01); *B32B 15/08* (2013.01); *B32B 15/20* (2013.01); *B32B 27/08* (2013.01); *B01L 2200/0689* (2013.01); *B01L 2300/0887* (2013.01); *B01L 2300/12* (2013.01); *B32B 2307/31* (2013.01); *B32B 2435/02* (2013.01); *B32B 2439/00* (2013.01)

(56) References Cited

U.S. PATENT DOCUMENTS

| | | | |
|---|---|---|---|
| 7,931,965 | B2 | 4/2011 | Yonezawa |
| 9,283,561 | B2 | 3/2016 | Takahashi et al. |
| 2006/0257648 | A1 | 11/2006 | Naegeli et al. |
| 2009/0074615 | A1 | 3/2009 | Moles |
| 2010/0175999 | A1 | 7/2010 | Barlow et al. |

FOREIGN PATENT DOCUMENTS

| | | |
|---|---|---|
| CN | 102119108 A | 7/2011 |
| CN | 103341369 A | 10/2013 |
| CN | 105934396 A | 9/2016 |
| DE | 4236886 A1 | 5/1994 |
| DE | 102010031519 A1 | 1/2012 |
| DE | 102013113285 A1 | 6/2015 |
| EP | 1426181 A1 | 6/2004 |
| EP | 2092989 A1 | 8/2009 |
| GB | 2530596 A | 3/2016 |
| WO | 2004110746 A1 | 12/2004 |
| WO | 2015098719 A1 | 7/2015 |

OTHER PUBLICATIONS

Lanxess Durethan® C38F 000000 Copolyamide; URL: http://www.matweb.com/search/datasheet.aspx? matguid=b743d35d2c4b4d4da2864e128b8f21ba [accessed on Mar. 12, 2019].
Wikipedia, Polyethylene terephthalate, Processing status: Dec. 16, 2018, URL: https://de.wikipedia.org/wiki/Polyethylenterephthalat, [accessed on Mar. 12, 2019].
Wikipedia, Polyamides, Prcessing status: Mar. 8, 2019. URL: https://de.wikipedia.org/wiki/Polyamide [accessed on Mar. 12, 2019].
Lupolen 2420 F, Technical Data Sheet, LyondellBasell Industries Holdings, 2018.

SAMPLE CONTAINER

CROSS-REFERENCE TO RELATED APPLICATION

This application is a continuation, under 35 U.S.C. § 120, of copending International Application PCT/EP 2019/076870, filed Oct. 4, 2019, which designated the United States; this application also claims the priority, under 35 U.S.C. § 119, of German Patent Application DE 10 2018 217 907.7, filed Oct. 19, 2018; the prior applications are herewith incorporated by reference in their entirety.

BACKGROUND OF THE INVENTION

Field of the Invention

The invention relates to a sample container having a sample carrier and a sealing film which serves in particular for the thermal sealing of a cavity of the sample carrier.

So-called microfluidic sample carriers, which are already used for diagnosis purposes, are formed by a substrate and a number of channel structures and/or chambers (in the following text, referred to in general as "cavity") are introduced therein. Constituents of a liquid in those cavities, for example, can be separated and/or conducted to (further) test chambers. In order to form a closed channel system, the cavities are covered with a sealing film, which is usually connected to the substrate. In that respect, it is important that a predefined channel cross section be maintained even after the covering with the sealing film, in order to retain a predefined flow resistance for the fluid guided in the respective cavity.

In order to be able to produce such sample carriers economically, they are usually in the form of injection molded components, hot-stamped components or thermoformed plastic films (therefore made of plastic). As a result, a thermal sealing of the channel structures by the sealing film is provided. For that purpose, the sealing film and optionally also the substrate are heated and pressed against one another. The sealing film and the substrate usually enter into a materially bonded connection in that case. Due to the heating, however, the risk is also increased of the cavities becoming closed to a large extent or completely by deformation of the substrate itself or by the sealing film, which is heated above the so-called glass transition temperature, due to the widths of the cavities, which are frequently in the range of less than one millimeter.

Sealing films known from the field of foodstuff packaging, which include a comparatively thick layer of a readily meltable material (for example a heat-sealing lacquer) to equalize surface inaccuracies of the substrate are also unfavorable for this reason. That is because the material, which melts under the applied heating temperature and runs ("squeezes") under the applied sealing pressure, would result in a closing, controllable only with difficulty, of the dimensions (in particular widths) of the cavities of the microfluidic sample carrier that can be in the range of a few micrometers to approximately 2000 micrometers.

Therefore, it has been partially sought to prevent softened parts of the sealing film from flowing into the cavities in a manner exceeding predefined tolerances in that a comparatively stiff sealing film, for example also the same material as is used for the substrate—e.g. a cyclic olefin copolymer ("COC")—is used. In that respect, however, the problem frequently occurs that the surface inaccuracies mentioned above cannot be equalized due to the comparatively high stiffness of the sealing film, and consequently a tight closing of the channel structures cannot be ensured.

BRIEF SUMMARY OF THE INVENTION

It is accordingly an object of the invention to provide a sample container, which overcomes the hereinafore-mentioned disadvantages of the heretofore-known containers of this general type and which improves the sealing of a cavity of a sample carrier.

With the foregoing and other objects in view there is provided, in accordance with the invention, a sample container having a sealing film—which also forms an independent invention—for the thermal sealing of a microfluidic cavity of the sample carrier. For this purpose, the sealing film includes a sealing layer for forming an adhesive connection to the sample carrier. In this respect, the sealing layer (in particular the material thereof) has a softening temperature which is in the range of or below a sealing temperature to which the sealing layer is heated during a sealing step, as intended, of a sealing process. The material of the sealing layer is preferably selected in such a way that it can adhere to a material forming the sample carrier. Moreover, the sealing film includes an outer layer, which (in particular the material thereof) in turn has a use temperature which—for at least short-term thermal loading—is greater than a sealing heating temperature as intended, that is greater than or equal to the sealing temperature. Furthermore, the sealing film has a height equalizing layer, the softening temperature of which (in particular that of the material of the height equalizing layer) is below the sealing heating temperature, with the result that, at a layer temperature which is present in the height equalizing layer—preferably during the sealing process, in particular the sealing step as intended—is less than or equal to the sealing heating temperature and is greater than or equal to the sealing temperature, the material forming the height equalizing layer is present in a ductile state due to the temperature. The height equalizing layer is preferably present in the molten state at this layer temperature. In the latter case, the height equalizing layer, in particular the material thereof, has in this case preferably a low viscosity above the softening temperature. The sealing film also has a decoupler layer. In this respect, the decoupler layer (the material thereof) has a stiffness which is increased by a multiple with respect to the height equalizing layer and the sealing layer at a layer temperature present in the decoupler layer—preferably during the sealing process, in particular the sealing step as intended—and is less than or equal to the sealing heating temperature and greater than or equal to the sealing temperature. Furthermore, the height equalizing layer is disposed between the outer layer and the decoupler layer. The sealing layer is disposed on the outside in relation to the decoupler layer and thus on that (bottom) side of the sealing film which faces away from the outer side.

The term "sealing temperature" is understood in this case and in the following text in particular to mean the temperature, specifically the temperature value, to which the sealing layer is heated during the sealing process, in order to enter into the adhesive connection with the sample carrier in the actual sealing step of the sealing process. The sealing temperature thus in particular constitutes a kind of target temperature to which the sealing layer is heated in the sealing process.

The term "sealing heating temperature" is understood in this case and in the following text in particular to mean the temperature, specifically the temperature value, which is applied to the sealing film with the aim of heating the sealing layer to the sealing temperature described above. For example, a sealing tool (also referred to in the following text as "sealing plate" or "stamp"), in this case in particular a type of heating plate, which bears against the outer layer in the sealing process, in particular in the sealing step, has the sealing heating temperature. As an alternative, a radiant heater, a heating fan or the like are used as a heating tool, through the use of which the sealing heating temperature is applied to the sealing film, in particular to the outer layer, in particular in a contactless manner.

In the sealing process as intended, the sealing heating temperature used is preferably a temperature value which is increased with respect to the sealing temperature and is applied to the outer layer of the sealing film by the sealing plate or some other heating tool. The sealing heating temperature and a process step duration are generally selected in this case in such a way that, within the process step duration, due to the conduction of heat through the outer layer, the height equalizing layer and the decoupler layer, a temperature gradient is set in which the sealing layer is heated to the sealing temperature. As a result, process time can be saved overall. The temperature value present in this case in the individual layers, in particular the height equalizing layer and the decoupler layer, is referred to in this case and in the following text as "layer temperature" and is consequently between the sealing heating temperature and the sealing temperature. As an alternative, it is possible—in a "static" variant—to select the sealing heating temperature also to be the same as the sealing temperature. In this case, time is spent waiting until the entire sealing film and thus all the layers have heated up to the sealing temperature.

A "ductile state due to the temperature" is understood in this case and in the following text in particular to mean that, above the sealing temperature, in particular at the corresponding layer temperature (in comparison with the room temperature), the material of the height equalizing layer has a deformation resistance which is as low as possible and thus can be plastically deformed at the corresponding layer temperature comparatively easily (in particular due to the process forces, in particular a "sealing pressure," which are applied during a conventional sealing process, usually by the sealing tool).

The sealing layer preferably has a high viscosity, preferably a viscosity which is higher than that of the height equalizing layer—which is thus heated to its layer temperature at this point in time—(thus a lower deformability which is ductile due to the temperature) at the "point in time at which sealing occurs"—i.e. during the sealing step, in particular when the sealing layer is heated to the sealing temperature and is preferably pressed against the sample carrier by the sealing tool.

The decoupler layer (specifically the material thereof) preferably also has—in particular at its layer temperature and thus optionally also above the sealing temperature—a plastic deformability which is low in particular in comparison with that of the height equalizing layer and the sealing layer, consequently a comparatively high strength.

The viscosity of the material of the height equalizing layer is particularly preferably lower than the viscosity of the sealing layer at least at the point in time at which the sealing layer is heated to or above the sealing temperature and thus the layer temperature of the height equalizing layer is the same as or greater than the sealing temperature.

The term "use temperature," in particular "short-term use temperature" is understood in this case and in the following text in particular to mean a temperature to which a material can be subjected without deformation which exceeds predefined limits, in the case of plastics in particular without melting—at least for a short time, i.e. in particular for a few seconds to several tens of seconds. In the case of plastics, this use temperature generally forms a limit of so-called heat distortion resistance.

The term "softening temperature" is understood in this case and in the following text in particular to mean a temperature (specifically a temperature value) from which in particular a (in particular amorphous) plastic transitions into the rubber-elastic range and thus its dimensional stability characteristic (in particular its ductility) increases. A transition into the molten state takes place fluently from the softening temperature. The softening temperature is also referred to as "glass transition temperature," in particular in the case of amorphous plastics (preferably amorphous thermoplastics). In conjunction preferably with partially crystalline plastics, the softening temperature is equated in this case and in the following text in particular also with the melting temperature, from which a crystalline phase of the plastic transitions into the molten state. This melting temperature is in this case generally above a glass transition temperature of the amorphous phase of the partially crystalline plastic.

The stiffness which is increased by a multiple with respect to that of the height equalizing layer and the sealing layer at the layer temperature as intended of the decoupler layer, i.e. when the sealing layer is heated to the sealing temperature, is understood in this case and in the following text in particular to mean that the decoupler layer has a high deformation resistance (thus a low "ductility" or "plasticity") at this layer temperature, whereas a comparable variable for the height equalizing layer and preferably also for the sealing layer due to the temperature can be set in particular as negligibly low or not (in particular no longer due to the temperature).

The sealing temperature as intended and the material of the sealing layer are preferably selected in such a way that they depend on one another, with the result that the softening temperature of the sealing layer is in the range of or below the sealing temperature. The material of the sealing layer is preferably selected in such a way that its softening temperature is, for example, between approximately 50 and 140° C., in particular between 70 and 110° C. The sealing heating temperature used in the sealing process and optionally the process step duration is then usually selected in such a way that the sealing temperature as intended is at or above the softening temperature of the material of the sealing layer. The sealing temperature in this case, for example, is typically in a range of between 80 and 140 degrees Celsius (° C.). The sealing heating temperature, which is applied for example by the sealing plate described above, is in this case for example—in particular for a process step duration which is as short as possible—at approximately 130 to 200° C., in particular at approximately 170° C.

Due to the multi-layered structure described above of the sealing film, it is possible to advantageously prevent the sealing film from deforming during the thermal sealing of the cavity of the sample carrier to such an extent that the cross section of the cavity is reduced beyond predefined limits relating to the application. This is made possible in particular in that the height equalizing layer is present in a state which is plastically deformable with only a low action of force, in particular in the molten state, during the sealing process—that is to say, in particular at the corresponding layer temperature, preferably above the sealing temperature—and as a result forms a comparatively easily deformable "cushion" between the outer layer and the decoupler layer. Due to the comparatively high stiffness of the decoupler layer, by contrast, the molten material of the height equalizing layer is prevented from being able to flow to too great an extent into the (specifically microfluidic) cavity of the sample carrier under the action of the sealing pressure which is applied by the sealing tool, in particular the sealing plate, which comes to lie against the outer layer. The decoupler layer thus has a damping effect on the (preferably molten) height equalizing layer. In particular for the case that, in the state in which it is heated to the sealing temperature, although the material of the sealing layer is heated above its softening temperature, due to its comparatively high viscosity—which is preferably increased with respect to that of the height equalizing layer—it has a comparatively low flow tendency in the direction of the surface of the sealing film, moreover, in interaction with the decoupler layer, the material of the sealing layer is prevented from flowing into the cavity. The height equalizing layer serves by contrast—in particular in the form of the deformable cushion—to equalize in particular comparatively large (for example, up to 50 micrometers, in particular greater than 10 and/or up to 30 micrometers) unevennesses on a contact surface of the sample carrier (i.e. in particular height differences which occur, for example, in the form of indentations or the like on the sample carrier that are caused by manufacturing). The sealing pressure applied by the sealing tool can thus be transferred comparatively homogeneously to the subsequent layers and thus also to the (at least approximately) entire contact surface of the sample carrier. Moreover, this in turn allows the sealing layer to have the high viscosity (in particular increased with respect to that of the height equalizing layer) described above, since the sealing layer does not have to equalize, or only has to equalize to a minor (residual) proportion, such large unevennesses. Consequently, in turn, the tendency of the sealing layer to flow into the cavity to be sealed during the sealing process can be advantageously reduced. Furthermore, the use temperature of the outer layer, which use temperature is increased with respect to the sealing heating temperature, makes it possible that the material of the outer layer does not adhere to the sealing tool and in particular retains its spatial stability. The outer layer thus serves as a protective layer of the height equalizing layer, which is molten during the sealing process, with respect to the sealing tool.

In a preferred embodiment, preferably at least in the state in which it is heated to the sealing heating temperature or the resulting layer temperature, the outer layer has an increased stiffness, in particular an increased deformation resistance, at least with respect to the height equalizing layer and/or the sealing layer, optionally also with respect to the decoupler layer (in particular at its respective resulting layer temperature during the sealing step). Due to this increased stiffness, the entire sealing film is advantageously prevented from "hanging into" the cavity to be sealed—i.e. curving inward into the cavity. That is to say that the selected stiffness of the outer layer contributes to a stabilization of the entire sealing film in the region of the (respective) cavity. Furthermore, this also makes it possible for the outer layer to form an approximately planar surface (i.e. without indentations), to which for example during laboratory operation a heat transferring surface can be attached particularly effectively.

In a further preferred embodiment, the material of the outer layer has a temperature-dependent shrinkage tendency, at least in the direction of the surface of the sealing film. In this case, the material of the outer layer (optionally also that of the decoupler layer) and/or in particular a process sequence during the sealing is preferably selected in such a way that the material has a temperature-induced shrinkage. The material of the outer layer (optionally also that of the decoupler layer) is, for example, a stretched plastics material (for example a stretched film), which shrinks during heating and thus associated mobilization of the molecular chains in particular due to relaxation of the molecular chains (which in this case in particular "ball together"). In addition or as an alternative, in a manner dissimilar to the sample carrier, the sealing film is heated, for example initially heated (for example by a radiant heater or heating fan) and then placed on the in particular cold (i.e. not heated) sample carrier, or the sample carrier which has been heated to a smaller extent. Due to the temperature difference, this results in different shrinkage (optionally only shrinkage of the sealing film) when cooling to room temperature. It is optionally the case that, when using the heating plate described above, time is not spent waiting for the sample carrier to heat through, so that this results in an unequal heating. Shrinkage of the outer layer during the sealing is advantageous to the effect that, in this way, formation of corrugations and thus a non-planar surface of the sealing film can be avoided. By contrast, an elongation of the outer layer would be conducive to indentations and thus the outer layer or the entire sealing film dipping in the region of the respective cavity.

In a further expedient embodiment, a thickness of the decoupler layer is selected depending on at least one dimension, preferably a width (i.e. in particular the smallest extent of the cavity in the direction of the surface of the sample carrier) of the cavity to be sealed. The thickness is expediently selected preferably with respect to comparable flat ("shallow") channels, the depths of which are preferably smaller than 500 μm. In this case, the thickness of the decoupler layer is selected preferably in dependence on the width of the cavity to be sealed and in particular also a predefined, permissible settling of the sealing film into this cavity. In particular when the settling-in depth should be reduced, and/or a wide (and in particular flat) cavity (width of preferably less than 1.5 millimeter) should be spanned by the sealing film, a greater thickness of the decoupler layer is selected. As a result, the decoupler layer and thus also the sealing film as a whole are stiffer and settling-in of the sealing film or dipping of the sealing film above the cavity is reduced. However, the thickness of the decoupler layer is preferably at least 15 micrometers, in particular more than 20 micrometers and particularly preferably approximately 30 micrometers. A thickness of 30 micrometers has proven to be advantageous in this case for application on a sample carrier with a plurality of cavities with different widths, to the effect that a settling of the sealing film to a sufficiently small extent, specifically of the height equalizing layer together with the decoupler layer and the sealing layer, into the respective cavity is made possible in the middle over the different widths of the cavities.

In a preferred embodiment, the outer layer is formed from a plastic, specifically a thermoplastic material.

In an expedient refinement, the outer layer in this case is formed from a biaxially oriented polyethylene terephthalate (BOPET for short), a cyclic olefin copolymer (COC, in particular with a correspondingly high glass transition temperature), a polychlorotrifluoroethylene (PCTFE for short), a polypropylene (PP), a cyclic olefin polymer (COP), a polyimide (PI), a polyether ether ketone (PEEK) or a polyamide (PA). In this respect, the plastics described above have the advantage that they have a comparatively high short-term utilization temperature (i.e. the use temperature described above) and thus damage, melting or the like at the sealing heating temperature is effectively avoided.

In a preferred embodiment, the height equalizing layer is formed from a low-melting thermoplastic material (i.e. which has a lower melting temperature) in particular in comparison with the outer layer. The selection of the plastic, in particular its ductile deformability and/or its increased flowability while the sealing heating temperature is acting, makes it possible to influence the suitability for equalizing the height of unevennesses on the sample carrier. At sealing temperatures (which are present in particular at the sealing surface between the sealing layer and the sample carrier) of less than 90° C., a linear polyethylene of low density (also referred to as "PE-LLD") is suitable, while for higher sealing temperatures (for example of greater than 100° C.) a polyethylene of low density, in particular a branched polyethylene (also referred to as "PE-LD"), can also be used, or at further increased sealing temperatures a polyethylene of high density ("PE-ND") or a thermoplastic elastomer (TPE) with a suitable (i.e. in particular low) melting temperature can also be used. Likewise, an ethylene vinyl acetate (EVA) with a correspondingly low melting point can also be used. The height equalizing layer is constructed, in particular its material is selected, while preferably taking the decoupler layer into account. In this respect, it is considered that, with increasing flowability of the height equalizing layer, the lateral plastic deformability of the height equalizing layer rises and thus also comparatively large surface unevennesses of the sample carrier can be compensated and/or settling into the cavities to a greater extent can occur. The decoupler layer, which is selected to be stiff in a manner corresponding to the flowability of the height equalizing layer, in this case preferably counteracts this local settling into the respective cavity (which does not have any dimensions).

In a preferred embodiment, the decoupler layer, in particular the material thereof, has a softening temperature which is greater than the sealing heating temperature applied by the sealing tool, at least greater than the layer temperature arising in the decoupler layer, when the outer layer is exposed to the sealing heating temperature as intended. This advantageously makes it possible for the decoupler layer to retain its dimensional stability even during the sealing process (i.e. in particular its stiffness is still sufficiently high), and thus filling of the cavity to be sealed by the height equalizing layer flowing in the direction of concave surface structures of the sample carrier under the sealing pressure is reduced or even prevented.

In the preceding embodiment, the decoupler layer is optionally formed from aluminum, in particular an aluminum film. However, the decoupler layer is further optionally formed from a plastic, preferably a COC (in particular with a high glass transition temperature), a polycarbonate (PC), a polymethyl methacrylate (PMMA for short), a polystyrene (PS) or by some other of the plastics provided for the outer layer.

In an expedient embodiment, the sealing layer is formed by a separate polymer layer. In this case, the sealing layer is thus in particular a film-like layer which has been applied to the decoupler layer or an optionally present intermediate layer by coextrusion or laminating.

In an alternative embodiment, the sealing layer is formed by a layer of the decoupler layer that is close to the surface and is modified by a surface treatment precisely of this decoupler layer (which is formed from a plastic in this embodiment). For this purpose, for example, the decoupler layer is dissolved close to the surface by a solvent and/or modified by radiation, plasma treatment or ozone treatment close to the surface in such a way that the polymer chains close to the surface are heat-sealable at a lower layer temperature than the uninfluenced "bulk material." This layer of the decoupler layer that is close to the surface then thus has different thermal and in particular also rheological properties than the rest of the decoupler layer, which is not modified.

In a further expedient embodiment, the material of the sealing layer is a COC, which is preferably different than a COC type forming the outer layer and/or the decoupler layer. The sealing layer is formed by a COC type with a glass transition temperature of approximately 79° C., for example. In this case, the decoupler layer is formed for example by a COC type with a glass transition temperature in the region of approximately 135° Celsius. As an alternative, the sealing layer is formed by the above-described surface treatment of the COC type of the decoupler layer.

In a further alternative variant, the sealing layer is formed by a hotmelt adhesive, also referred to as "hotmelt." This is optionally a purely thermoplastic hotmelt adhesive. As an alternative, it is a reactive hotmelt adhesive, for example based on polyurethane, or a UV-precrosslinked and/or UV-crosslinked (hotmelt) adhesive.

In a preferred embodiment, a thickness of the sealing layer is between approximately 5 and 30 micrometers, preferably is approximately 20 micrometers. At this thickness, settling or penetration of the material of the sealing layer that is heated above the softening temperature into the cavity during the sealing process is sufficiently low, but nevertheless an equalization of comparatively sharp-edged and/or comparatively small ("flat") unevennesses on the order of magnitude of up to 10 or 15 micrometers on the surface of the sample carrier—which are caused, for example, by milling tracks or marks in a manufacturing tool—is made possible.

In an optional embodiment, the sealing film has at least one, optionally more additional layers, which lie in particular between the layers described above. These serve, for example, for the improved mutual adhesion of the layers described above, i.e. the outer layer, the height equalizing layer, the decoupler layer and the sealing layer.

The sample container according to the invention includes the sample carrier described above. The sample carrier has, as described above, the number of microfluidic cavities (in particular channel structures and/or chambers) for receiving a fluid. Moreover, the sample container includes the sealing film described above. Through the use of this sealing film, the number of microfluidic cavities can be sealed or is already sealed in a sealed state as intended.

"Microfluidic cavities" are to be understood in this case and in the following text in particular to mean channels or chambers with a width of several tens of micrometers to several 100 micrometers (optionally also a settable number of millimeters). A length of the channels or chambers extends in this respect over approximately the same order of magnitude or even up to several tens of millimeters.

The sealing film described above is thus preferably used to seal the number of cavities of the sample carrier.

The sample container according to the invention thus similarly has the features and advantages described above in connection with the sealing film.

The material of the sealing layer and/or of the sample carrier is preferably selected in such a way that they are compatible with one another in particular in terms of their mutual adhesiveness, therefore that both materials can be adhesively bonded to one another (in particular without a separate additive). Both materials are polar or unpolar, for example.

The material of the sample carrier is formed, for example, by a COC or some other plastic which is compatible with the sealing layer and has a glass transition temperature of between 60 and 150° C., preferably between 100 and 140° C. At a glass transition temperature of greater than 135° C., the sealing temperature is preferably increased, with the result that the formation of the adhesive connection between the sealing layer and the sample carrier is simplified (due to in particular temperature-dependent diffusion effects and the like). In the sealing step as intended, the sealing pressure is reduced in this case, in order to avoid too strong a lateral flow of the material of the height equalizing layer.

In this respect, the sample carrier is optionally in the form of an injection molded component, a hot-stamped component or a thermoformed plastic film.

The conjunction "and/or" is to be understood in this case and in the following text in particular in such a way that the features linked by this conjunction can be configured both together or as alternatives to one another.

Other features which are considered as characteristic for the invention are set forth in the appended claims.

Although the invention is illustrated and described herein as embodied in a sample container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
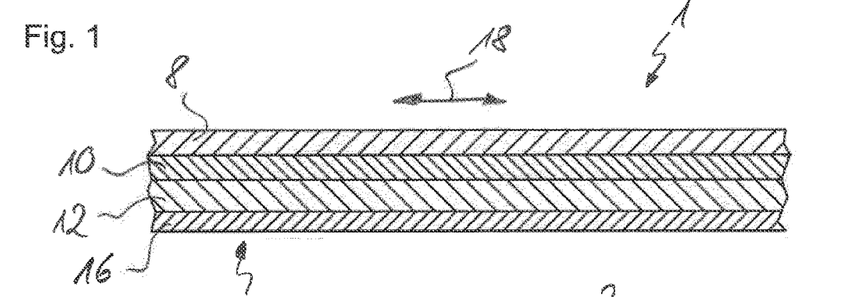
FIG. 1 is a fragmentary, diagrammatic, longitudinal-sectional view of a sealing film.
Figure 2:
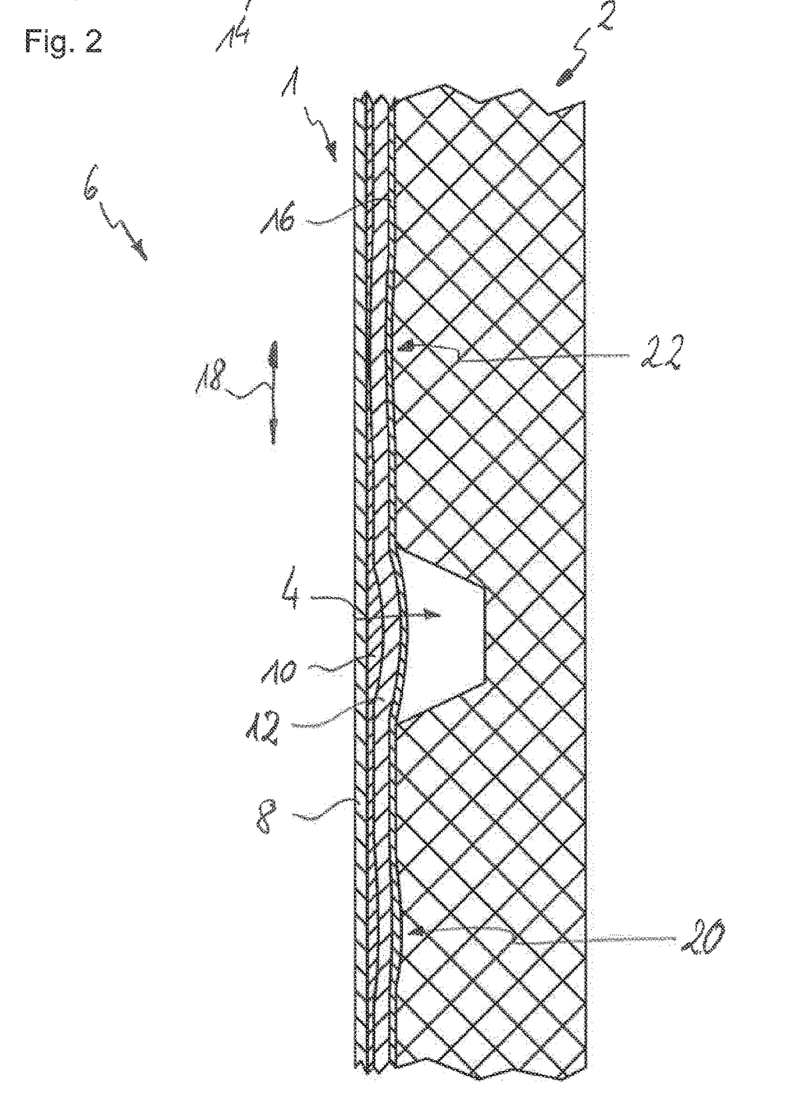
FIG. 2 is a fragmentary, longitudinal-sectional view of a sample container, which includes a sample carrier with a cavity sealed by the sealing film shown FIG. 1.

Referring now in detail to the figures of the drawings, in which parts that correspond to one another are always provided with the same reference signs, and first, particularly, to FIG. 1 thereof, there is seen a diagrammatic illustration of a sealing film 1 in cross section. The sealing film 1 is produced from a plurality of layers formed from different plastics. The sealing layer 1 serves specifically for sealing a sample carrier 2, which is illustrated in FIG. 2, specifically a cavity 4 formed into this sample carrier 2. The sample carrier 2 is a substrate formed from a COC with a glass transition temperature of approximately 110° C. and into which a number of so-called microfluidic channels and chambers, i.e. channels or chambers with a width of several tens of micrometers to several 100 micrometers (optionally also a settable number of millimeters), are introduced. A length of the channels or chambers extends in this respect over approximately the same order of magnitude or even up to several tens of millimeters. These channels and chambers each form a cavity 4. The sealing film 1, together with this sample carrier 2, forms a sample container 6 (see FIG. 2).

The layer structure of the sealing film 1 includes an outer layer 8, which in the illustrated exemplary embodiment is formed by a layer of a biaxially oriented polyethylene terephthalate (BOPET) with a thickness of 12.5 micrometers. A height equalizing layer 10, which is formed from a polyethylene of low density and with a thickness of 30 micrometers, adjoins the outer layer 8. A decoupler layer 12, which is formed from a layer of a COC with a glass transition temperature of approximately 135° C. that is 30 micrometers thick, adjoins the height equalizing layer 10. On a bottom side 14 of the sealing film 1, situated opposite the outer layer 8, the layer structure of the sealing film 1 has a sealing layer 16 which is formed from a COC with a glass transition temperature of approximately 79° C.

In order to seal the cavity 4 of the sample carrier 2, the sealing film 1 is pressed against the sample carrier 2 by a sealing tool, specifically a "sealing plate," which is not illustrated in more detail. In the process, the sealing tool comes to lie against the outer layer 8 and is heated to a sealing heating temperature which lies considerably above the softening temperature or glass transition temperature of the sealing layer 16. Specifically, the sealing heating temperature is at 170° C. in the exemplary embodiment described, in order to allow the sealing film 1 and thus also the sealing layer 16 to be heated as quickly as possible to a sealing temperature which is likewise above the glass transition temperature of the sealing layer 16. Due to a temperature gradient which forms in the sealing film 1, in the present exemplary embodiment, the sealing temperature is at approximately 100 to 110° C.—with a comparatively short heating time of a few seconds (for example up to 5, 10 or up to 20 seconds). In the process, the sealing tool heats the sealing film 1 and also a layer of the sample carrier 2 that is close to the surface. At the sealing temperature, the sealing layer 16 is softened, with the result that diffusion operations with the material of the sample carrier 2 can occur and thus hotmelt bonding and adhesion of the sealing film 1 to the sample carrier 2 can occur.

The sealing heating temperature is below the softening temperature of the material of the outer layer 8. A layer temperature of the decoupler layer 12 that is set due to the temperature gradient is likewise below the softening temperature of the material of the decoupler layer 12. The sealing heating temperature and the set layer temperature of the height equalizing layer 10 are, by contrast, above the softening temperature, specifically the melting temperature of the material of the height equalizing layer 10. When the sealing film 1 is being heated during the sealing process, the material of the height equalizing layer 10 thus transitions into the easily plastically deformable, specifically molten state. Since the polyethylene of low density of the height equalizing layer 10 has a comparatively low viscosity in the molten state, the melt of the height equalizing layer 10 can be displaced under the action of the sealing pressure applied by the sealing tool in a direction 18 of the surface of the sealing film 1 and thus flow in the direction 18 of the surface.

This lateral flowing of the material of the height equalizing layer 10 makes it possible to fill indentations 20 in the substrate of the sample carrier 2 by an accumulation of material of the height equalizing layer 10, in that the decoupler layer 12 and the sealing layer 16 are deflected in the direction of the indentation 20. In a correspondingly reversed manner, elevations 22 on the sample carrier 2 can likewise be equalized by a thinning, specifically a lateral displacement of the material of the height equalizing layer 10 in the direction 18 of the surface.

Since the decoupler layer 12 is not yet heated to its softening temperature at its layer temperature, the decoupler layer likewise has such a high stiffness that an excessive (i.e. beyond predefined limits specific to the application) settling of the decoupler layer 12 and the sealing layer 16 attached thereto into the cavity 4 is prevented. In the process the sealing film 1 only slightly settles into the cavity 4 at a width of the cavity 4 of below 500 micrometers, in particular of below 100 micrometers.

The viscosity of the sealing layer 16 is also considerably increased at the sealing temperature with respect to the viscosity of the height equalizing layer 10, with the result that the sealing layer 16, specifically the material of the sealing layer 16, is prevented from flowing in the direction 18 of the surface or this flowing is only possible to a negligible degree.

The outer layer 8 forms a temperature-stable protective layer with respect to the sealing tool, which prevents material of the sealing film 1 from remaining adhered to the sealing tool, that has been heated to the sealing heating temperature. Furthermore, the material, in particular the BOPET of the outer layer 8, has such a high stiffness—even at the sealing heating temperature—that the outer layer 8 is effectively prevented from hanging (or dipping) into the respective cavity 4. After the sealing of the cavity 4, the outer layer 8 thus also forms an at least approximately planar outer surface, to which the heat transferring surfaces (for example a heating or cooling surface) can be attached in a laboratory operation as intended. Should the outer layer 8 nevertheless be curved inward slightly into the cavity 4 when the cavity 4 is of a sufficient size, the outer layer can be curved back again to the outer side by the fluid pressure which usually prevails in the cavity 4 in laboratory operation as intended.

Figure 3:
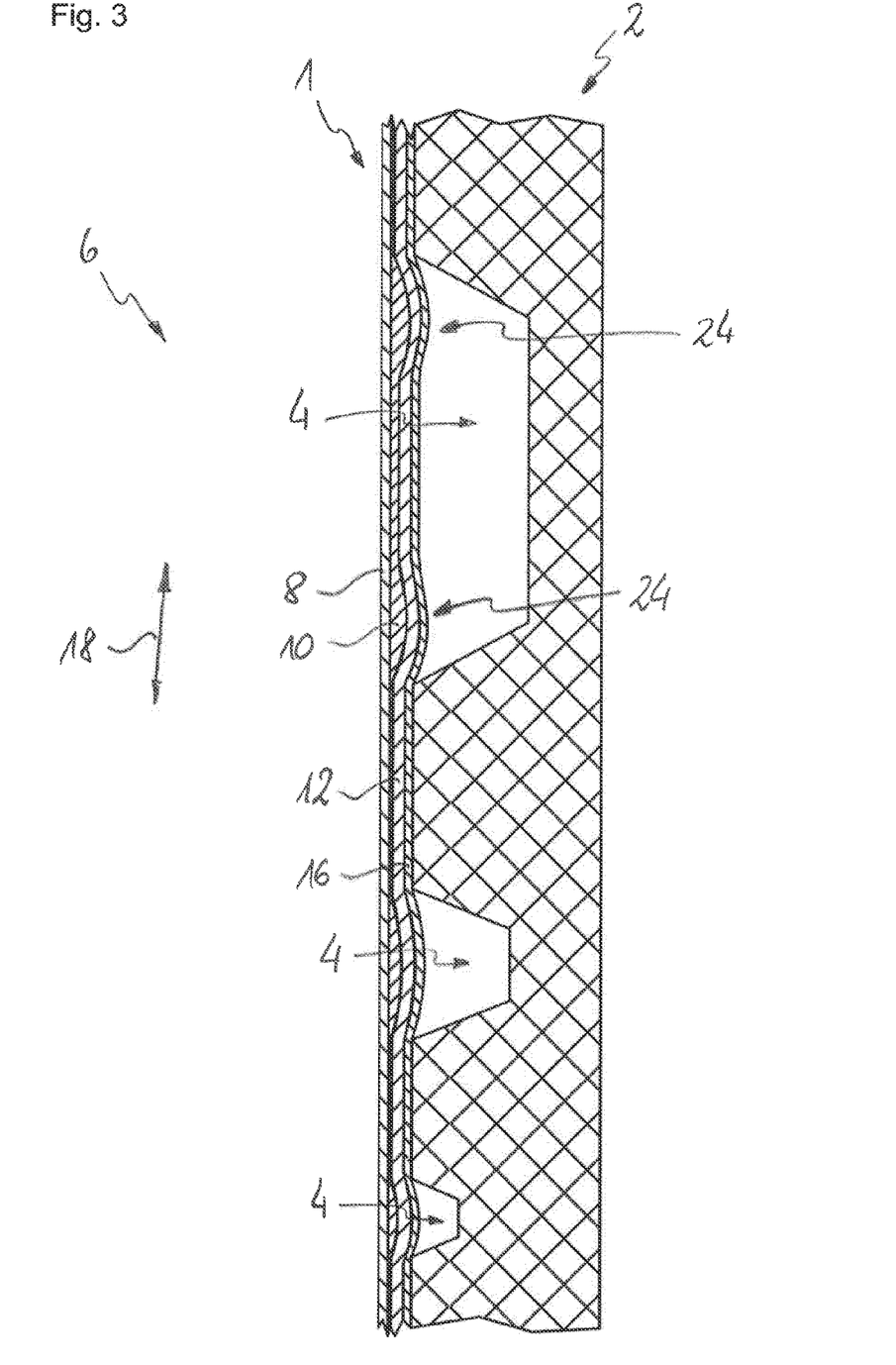
FIG. 3 is a view similar to FIG. 2 of the sample container with three differently sized cavities, which are sealed together by the sealing film.

FIG. 3 illustrates by way of example a sample carrier 2 with a plurality of differently sized cavities 4. The effect of the sealing film 1 according to the invention will be able to be described clearly regarding this matter. In FIG. 3, the cavity 4 illustrated at the bottom is provided with the smallest cross section. Correspondingly, the curving inward of the sealing film 1 due to the height equalizing layer 10 which is liquefied in the sealing process also happens to a small extent. In the enlarged cavity 4 (in the middle) illustrated above the cavity 4 illustrated at the bottom, the curving inward of the sealing film 1 with respect to the lower cavity 4 is slightly greater, but regarded percentally is even smaller than in the lower cavity 4. The sealing film 1 can thus be attached over all of its surface area to the surface of the sample carrier 2 due to the above-described adaptation to surface unevennesses of the sample carrier 2 by the height equalizing layer 10. Nevertheless, however, it is also possible to avoid sealing the respective cavity 4 to too great an extent.

As can be seen with reference to the cavity 4 illustrated at the top in FIG. 3, the width of which is in the range of approximately two millimeters, the sealing film 1 in this case does not curve inward completely—as in the case of the smaller cavities 4 in the lower region of FIG. 3—but rather the curving inward takes place only in regions 24 of the cavity 4 that are close to the edge. In this respect, test results have shown that, when the materials and the layer thicknesses of the sealing film 1 are selected as described above, a curving inward of the sealing film 1 in the peripheral regions 24 extends approximately in the range of 500 micrometers in the direction of the middle of the cavity 4.

The subject matter of the invention is not restricted to the exemplary embodiment described above. Rather, further embodiments of the invention may be derived from the preceding description by a person skilled in the art.

The following is a summary list of reference numerals and the corresponding structure used in the above description of the invention.

LIST OF REFERENCE SIGNS

1 Sealing film
2 Sample carrier
4 Cavity
6 Sample container
8 Outer layer
10 Height equalizing layer
12 Decoupler layer
14 Bottom side
16 Sealing layer
18 Direction of the surface
20 Indentation
22 Elevation
24 Peripheral region

The invention claimed is:

1. A sample container, comprising:
   a sample carrier having a plurality of microfluidic cavities for receiving a fluid; and
   a sealing film sealing or intended to seal said plurality of cavities in a sealed state, said sealing film including:
      a sealing layer for forming an adhesive connection to said sample carrier, said sealing layer having a softening temperature in a range of or below a sealing temperature to which said sealing layer is intended to be heated during a sealing step;
      an outer layer having a use temperature being greater than an intended sealing heating temperature being greater than or equal to said sealing temperature;
      a height equalizing layer having a softening temperature below said sealing heating temperature, permitting a material forming said height equalizing layer to be present in a state being deformable in a ductile manner due to temperature, at a layer temperature being present in said height equalizing layer being less than or equal to said sealing heating temperature and greater than or equal to said sealing temperature; and
      a decoupler layer having a stiffness being increased by a multiple relative to said height equalizing layer and said sealing layer at a layer temperature being present in said decoupler layer being less than or equal to said sealing heating temperature and greater than or equal to said sealing temperature;
   said height equalizing layer being disposed between said outer layer and said decoupler layer; and
   said sealing layer being disposed outwardly relative to said decoupler layer.

2. The sample container according to claim 1, wherein said outer layer has a greater stiffness than at least one of said height equalizing layer or said sealing layer.

3. The sample container according to claim 1, wherein said outer layer has a temperature-dependent shrinkage tendency, at least in a direction of a surface of said sealing film.

4. The sample container according to claim 1, wherein said decoupler layer has a different thickness selected in dependence on a dimension of said plurality of cavities to be sealed.

5. The sample container according to claim 1, wherein said outer layer is formed of a BOPET, a COC, a PCTFE, a PP, a COP, a PI, a PEEK or a PA.

6. The sample container according to claim 1, wherein said height equalizing layer is formed of a PE-LD, a PE-LLD, a PE-HD, an EVA or a TPE.

7. The sample container according to claim 1, wherein said decoupler layer at least one of:
- has a softening temperature being greater than a layer temperature present in said decoupler layer in an intended sealing process, or
- is formed of an aluminum, a COC, a PC, a PMMA, a COP, a PI, a PA, a PEEK or a PS.

8. The sample container according to claim 1, wherein said sealing layer is formed of a separate polymer layer.

9. The sample container according to claim 1, wherein said sealing layer is formed of a layer of said decoupler layer being close to a surface and being modified by a surface treatment.

10. The sample container according to claim 1, wherein said sealing layer is formed of a COC or a hotmelt adhesive.

11. The sample container according to claim 1, wherein said sealing layer has a thickness of between 5 and 30 micrometers.

12. The sample container according to claim 1, wherein said sealing layer has a thickness of approximately 20 micrometers.

\* \* \* \* \*